United States Patent [19]

Creger et al.

[11] Patent Number: 5,551,930
[45] Date of Patent: Sep. 3, 1996

[54] ADAPTIVE CONTROL METHOD FOR AN AUTOMATIC TRANSMISSION

[75] Inventors: Todd D. Creger, Metamora; Richard B. League, Peoria; Randall M. Mitchell, Washington; David M. Spurlock, Peoria, all of Ill.; James R. Talbott, Westborough, Mass.; Gregory L. Williamson, Metamora, Ill.

[73] Assignee: Caterpillar Inc., Peoria, Ill.

[21] Appl. No.: 421,722

[22] Filed: Apr. 13, 1995

[51] Int. Cl.$^6$ .................................................. F16H 61/26
[52] U.S. Cl. ........................... 477/130; 477/143; 477/155; 475/123; 475/128
[58] Field of Search ...................... 475/127, 128, 475/123, 120, 62, 63; 477/127, 130, 131, 143, 155

[56] References Cited

U.S. PATENT DOCUMENTS

| | | | |
|---|---|---|---|
| 3,956,947 | 5/1976 | Leising et al. | 74/866 |
| 4,208,929 | 6/1980 | Heino et al. | 74/731 |
| 4,414,863 | 11/1983 | Heino | 74/866 |
| 4,419,909 | 12/1983 | Opperud et al. | 74/856 |
| 4,653,350 | 3/1987 | Downs et al. | 74/864 |
| 4,707,789 | 11/1987 | Downs et al. | 364/424.1 |
| 4,724,939 | 2/1988 | Lockhart et al. | 192/3.3 |
| 4,790,418 | 12/1988 | Brown et al. | 477/155 X |
| 4,836,057 | 6/1989 | Asayama et al. | 74/867 |
| 4,838,124 | 6/1989 | Hamano et al. | 74/866 |
| 4,841,815 | 6/1989 | Takahashi | 74/866 |
| 4,843,902 | 7/1989 | Patton et al. | 74/335 |

(List continued on next page.)

FOREIGN PATENT DOCUMENTS

| | | |
|---|---|---|
| 0357184A1 | 3/1990 | European Pat. Off. . |
| 0196358B1 | 5/1990 | European Pat. Off. . |
| 0435377A3 | 7/1991 | European Pat. Off. . |
| 0435375A3 | 7/1991 | European Pat. Off. . |
| 0372073B1 | 2/1994 | European Pat. Off. . |
| 4017961 | 12/1990 | Germany . |
| 3407716 | 1/1993 | Germany . |
| 2212871A | 8/1989 | United Kingdom . |
| WO9102913 | 3/1991 | WIPO . |

OTHER PUBLICATIONS

Article from Off–Highway Engineering Magazine dated Apr. 1993 entitled "Transmission Control System for Bulldozers".
Article No. 820392 entitled "Electronic Control of Automobile Transmissions" by G. Pannier and A. Laport.
Article No. 820394 entitled "Microcomputer Controlled Automatic Transmission" by A. L. Miller.
Article No. 830880 entitled "Development of NISSAN Microprocessor Controlled Four Speed Lockup Automatic Transmission" by I. Suga et al.
Article No. 840448 entitled "Electronic Control of a 4–Speed Automatic Transmission with Lock–Up Clutch" by M. Schwab.
Article No. 901154 entitled "Trends of Powertrain Control" by N. Narumi et al.

(List continued on next page.)

*Primary Examiner*—Charles A. Marmor
*Assistant Examiner*—Peter Kwon
*Attorney, Agent, or Firm*—David M. Masterson

[57] ABSTRACT

The present invention relates to an adaptive control method for an automatic transmission. The method includes the steps of:

(a) commanding a predetermined clutch to fill in accordance with a plurality of clutch fill parameters;

(b) determining the actual time to completely fill the clutch;

(c) comparing the actual fill time with a predetermined fill time; and (d) adjusting at least one of the plurality of clutch fill parameters in response to the comparison in order to modify the clutch fill period during subsequent shifts to the predetermined clutch. Accordingly, the present invention adapts future shifts based on past shifts to improve the shift quality of the transmission.

17 Claims, 14 Drawing Sheets

U.S. PATENT DOCUMENTS

| | | | |
|---|---|---|---|
| 4,854,194 | 8/1989 | Kaneko et al. | 74/866 |
| 4,855,913 | 8/1989 | Brekkestran et al. | 364/424.1 |
| 4,875,391 | 10/1989 | Leising et al. | 74/866 |
| 4,953,679 | 9/1990 | Okino | 192/0.096 |
| 4,955,256 | 9/1990 | Kashihara et al. | 74/866 |
| 4,967,385 | 10/1990 | Brekkestran et al. | 364/571.03 |
| 4,967,611 | 11/1990 | Sugano | 74/868 |
| 4,967,620 | 11/1990 | Shimanaka | 74/866 |
| 4,968,999 | 11/1990 | Fodale et al. | 364/424.1 |
| 4,969,098 | 11/1990 | Leising et al. | 364/424.1 |
| 4,975,845 | 12/1990 | Mehta | 364/424.1 |
| 4,981,053 | 1/1991 | Yamaguchi | 74/866 |
| 4,982,620 | 1/1991 | Holbrook et al. | 74/731.1 |
| 4,989,470 | 2/1991 | Bulgrien | 74/335 |
| 4,991,455 | 2/1991 | Bulgrien | 74/336 R |
| 5,004,084 | 4/1991 | Mehr-Ayin et al. | 192/0.033 |
| 5,005,441 | 4/1991 | Narita | 74/866 |
| 5,005,444 | 4/1991 | Kimura et al. | 74/868 |
| 5,005,680 | 4/1991 | Satoh et al. | 192/3.55 |
| 5,007,308 | 4/1991 | Narita | 74/866 |
| 5,014,573 | 5/1991 | Hunter et al. | 74/866 |
| 5,014,575 | 5/1991 | Fujiwara et al. | 74/866 |
| 5,016,175 | 5/1991 | Baltusis et al. | 364/424.1 |
| 5,018,408 | 5/1991 | Bota et al. | 74/866 |
| 5,029,086 | 7/1991 | Yoshimura | 364/424.1 |
| 5,029,492 | 7/1991 | Kiuchi | 74/844 |
| 5,029,494 | 7/1991 | Lentz et al. | 74/866 |
| 5,033,328 | 7/1991 | Shimanaka | 74/866 |
| 5,035,312 | 7/1991 | Asayama et al. | 192/85 R |
| 5,036,718 | 8/1991 | Bulgrien | 74/335 |
| 5,036,730 | 8/1991 | Sakai et al. | 74/866 |
| 5,038,286 | 8/1991 | Asayama et al. | 364/424.1 |
| 5,038,636 | 8/1991 | Vukovich et al. | 74/866 |
| 5,046,174 | 9/1991 | Lentz et al. | 364/424.1 |
| 5,046,175 | 9/1991 | Lentz et al. | 364/424.1 |
| 5,046,176 | 9/1991 | Lin | 364/424.1 |
| 5,046,178 | 9/1991 | Hibner et al. | 364/424.1 |
| 5,050,456 | 9/1991 | Fukuda | 74/866 |
| 5,050,458 | 9/1991 | Vukovich et al. | 74/866 |
| 5,052,246 | 10/1991 | Yamaguchi | 74/866 |
| 5,053,960 | 10/1991 | Brekkestran et al. | 364/424.1 |
| 5,054,599 | 10/1991 | Marcott | 192/85 R |
| 5,056,639 | 10/1991 | Petzold et al. | 192/0.076 |
| 5,058,460 | 10/1991 | Hibner et al. | 74/867 |
| 5,063,813 | 11/1991 | Lentz | 74/866 |
| 5,063,814 | 11/1991 | Baba et al. | 74/866 |
| 5,067,084 | 11/1991 | Kau | 364/453 |
| 5,067,373 | 11/1991 | Kyohzuka et al. | 74/866 |
| 5,067,374 | 11/1991 | Sakai et al. | 74/866 |
| 5,069,084 | 12/1991 | Matsuno et al. | 74/844 |
| 5,070,747 | 12/1991 | Lentz et al. | 74/866 |
| 5,072,930 | 12/1991 | Lentz et al. | 364/424.1 |
| 5,085,105 | 2/1992 | Wakahara et al. | 74/866 |
| 5,101,943 | 4/1992 | Bulgrien | 192/3.63 |
| 5,113,720 | 5/1992 | Asayama et al. | 74/866 |
| 5,119,697 | 6/1992 | Vukovich et al. | 74/867 |
| 5,154,099 | 10/1992 | Asatsuke et al. | 477/127 |
| 5,163,342 | 11/1992 | Pollack et al. | 74/866 |
| 5,168,973 | 12/1992 | Asayama et al. | 192/85 R |
| 5,174,137 | 12/1992 | Kato et al. | 73/118.1 |
| 5,188,005 | 2/1993 | Sankpal et al. | 477/155 X |
| 5,190,130 | 3/1993 | Thomas et al. | 192/0.032 |
| 5,209,141 | 5/1993 | Asayama et al. | 74/866 |
| 5,211,079 | 5/1993 | Runde et al. | 74/866 |
| 5,216,606 | 6/1993 | Lentz et al. | 364/424.1 |
| 5,224,577 | 7/1993 | Falck et al. | 192/0.092 |
| 5,251,509 | 10/1993 | Pollack et al. | 74/861 |
| 5,282,401 | 2/1994 | Hebbale et al. | 74/866 |
| 5,289,741 | 3/1994 | Debs et al. | 74/866 |
| 5,311,795 | 5/1994 | Yoshimura et al. | 477/128 X |
| 5,403,248 | 4/1995 | Ando et al. | 477/130 |
| 5,467,854 | 11/1995 | Creger et al. | 477/155 X |
| 5,468,198 | 11/1995 | Holbrook et al. | 477/143 |
| 5,472,389 | 12/1995 | Ando et al. | 477/131 X |

OTHER PUBLICATIONS

Article No. 901156 entitled "Electronically-controlled Transmission Systems—Current Position and Future Developments" by M. Schwab.

Article No. 901157 entitled "Advanced Controls for Heavy Duty Transmission Applications" by J. Bender and K. Struthers.

Article No. 901160 entitled"Powertrain Electronics—Progress on the Use and Development of the Computer Aided Gearshift Systems" by Bader.

Komatsu Technical Guide entitled "K-Atomics—Komatsu–Advanced Transmission with Optimum Modulatiion Control".

SAE Article 890528 entitled "The Chrysler A–604 Ultradrive 4–Speed Automatic Transaxle" by B. Martin and T. Nogle.

SAE Article No. 861050 entitled "Electronically Controlled Mechnical Automatic Transmission for Heavy Duty Trucks and Buses" by. S. Tanaka.

SAE Article No. 890529 entitled "The All–Adaptive Controls for the Chrysler Ultradrive Transaxle" by M. Leishing et al.

SAE Article No. 890530 entitled "Nissan Electronically Controlled Four Speed Automatic Transmission" by M. Shinohara et al.

SAE Technical Paper No. 861170 entitled "Digital Electronic Controls for Detroit Diesel Allison Heavy Hauling Transmissions" by R. C. Boyer.

SAE Technical Paper No. 861212 entitled "The Design and Development of A Four Speed Powershift Transmission . . . " by J. E. Goodbar et al.

SAE Technical Paper No. 880480 entitled "Borg–Warner Australia Model 85 Automatic Transmission" by E. Wilfinger and J. Thompson.

SAE Technical Paper No. 892000 entitled "A Study on Electro–Hydraulic Control for Automatic Transmission" by K. Hasunaka et al.

SAE Technical Paper No. 900550 entitled "Toyota ECT–i a New Automatic Transmission with Intelligent . . . " by T. Kondo et al.

SAE Technical Paper No. 901557 entitled "A Transmission Control System for Construction Machinery" by K. Kusaka and Y. Ohkura.

SAE Technical Paper No. 901592 entitled "Adaptive Electronic Tractor Shift Control System" by L. Ross and D. Panoushek.

SAE Technical Paper No. 910082 entitled "An Engine & Transmission Control System with New 16-bit Single Chip . . . " by S. Kuroyanagi et al.

SAE Technical Paper No. 910410 entitled "SCVT—A State of the Art Electronically Controlled Continuously Variable . . . " by S. Hirano et al.

SAE Technical Paper No. 910639 entitled "Analysis of a New Automatic Transmission Control System for LEXUS LS400" by H. Taniguchi et al.

SAE Technical Paper No. 910750 entitled "Diesel Deposit Forming Tendencies—Microanalysis Methods" by J. Perez et al.

SAE Technical Paper No. 911831 entitled "User–Friendly Electronic Powershift Transmission Controls" by G. Bulgrien.

SAE Technical Paper No. 911938 entitled "New Kubota Midsize Farm Tractor" by E. Shinohara et al.

SAE Technical Paper No. 911880 entitled "Improving Automatic Transmission Shift Quality by Feedback Control . . . " by Y. Narita.

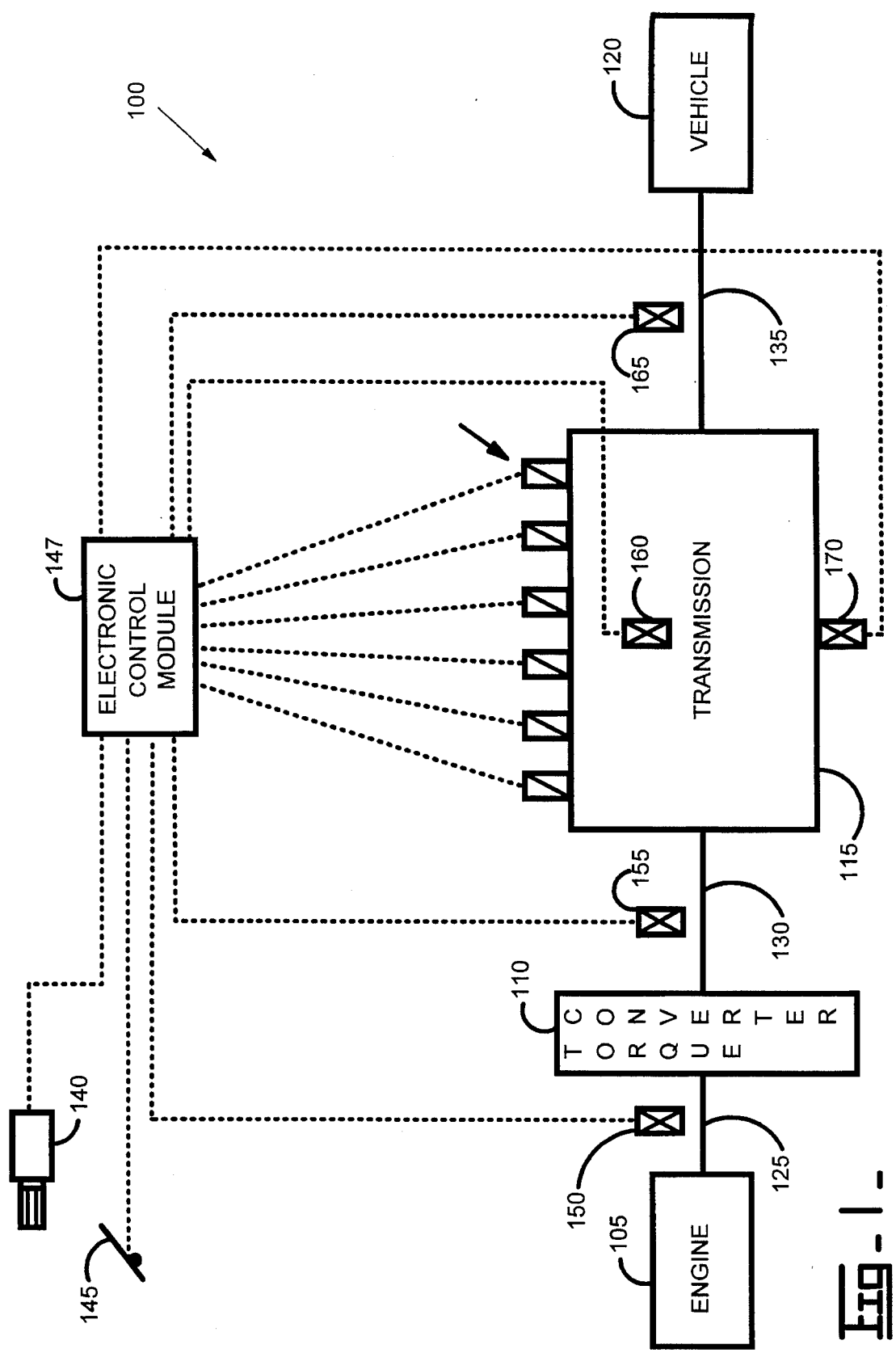
Fig.-1.-

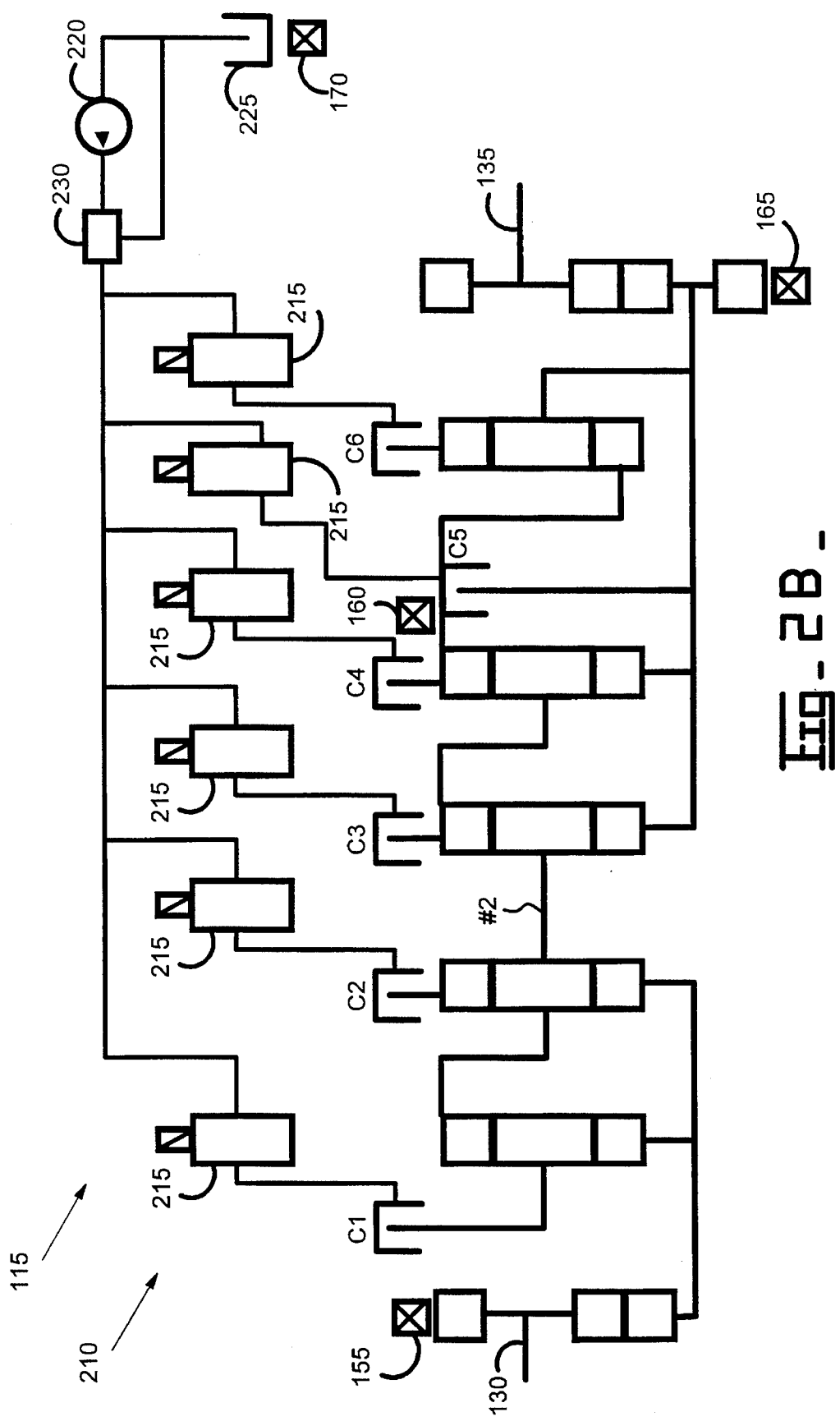
Fig-2B-

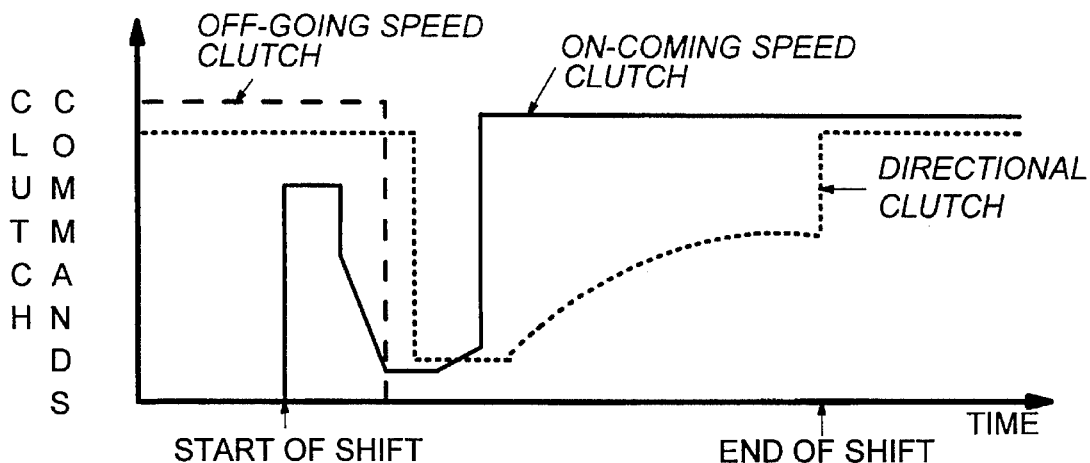
Fig_3A_
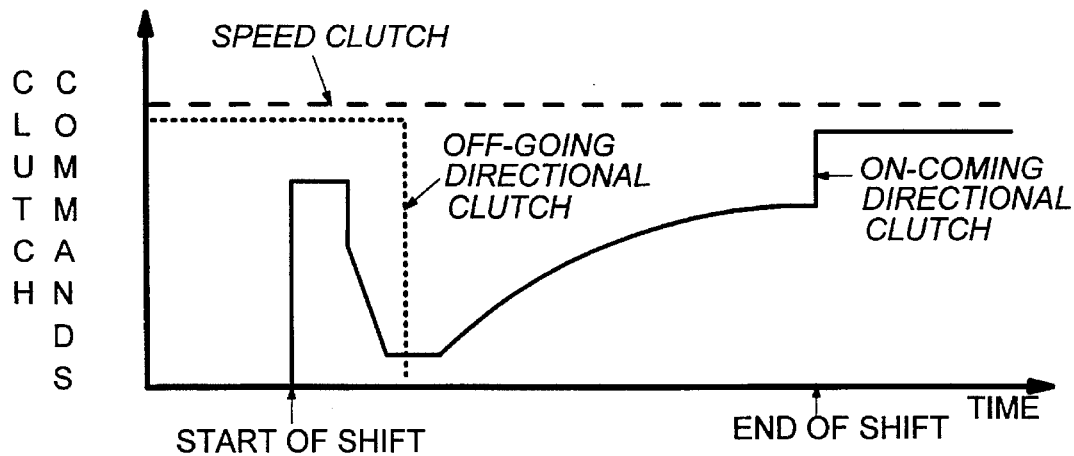
Fig_3B_
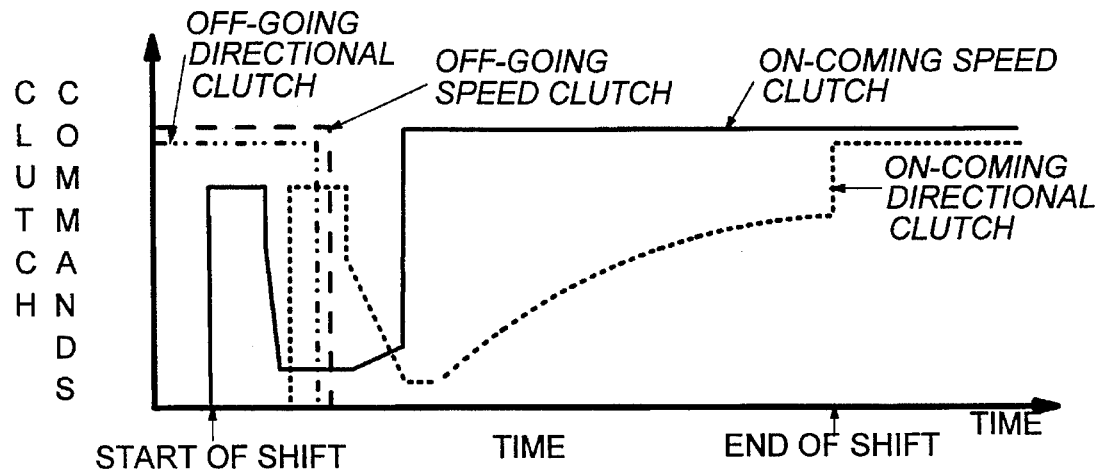
Fig_3C_

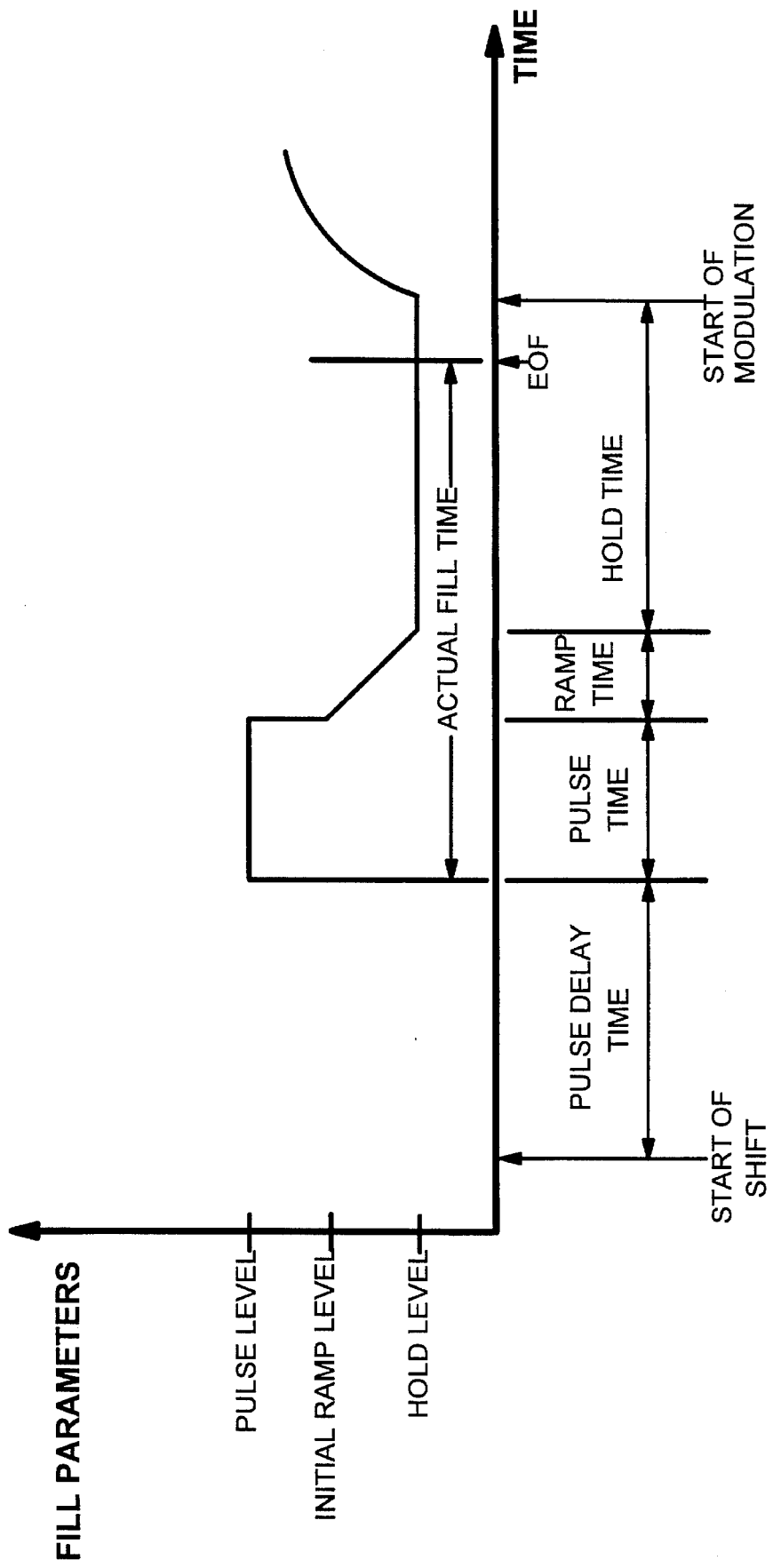

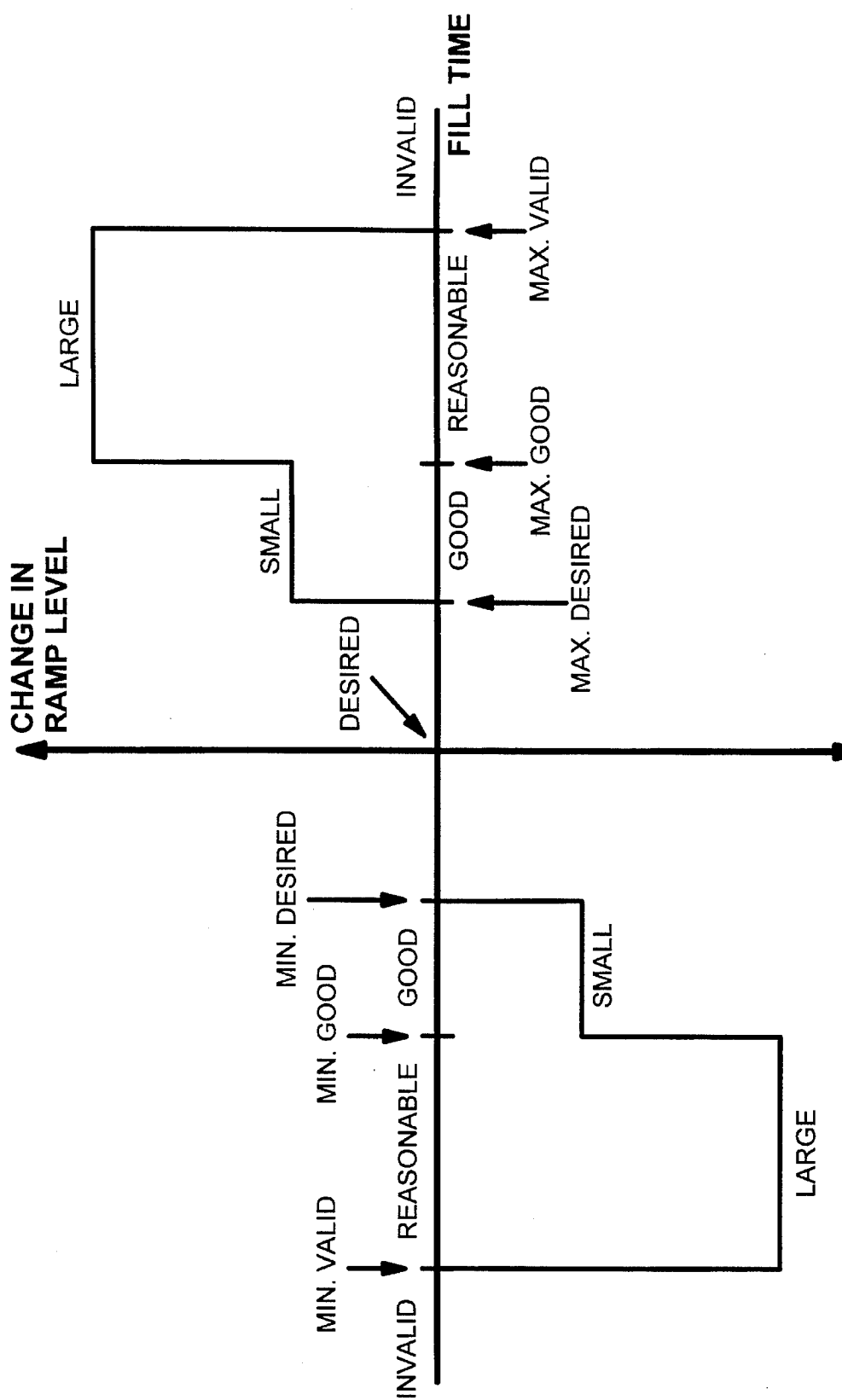
Fig - 5 -

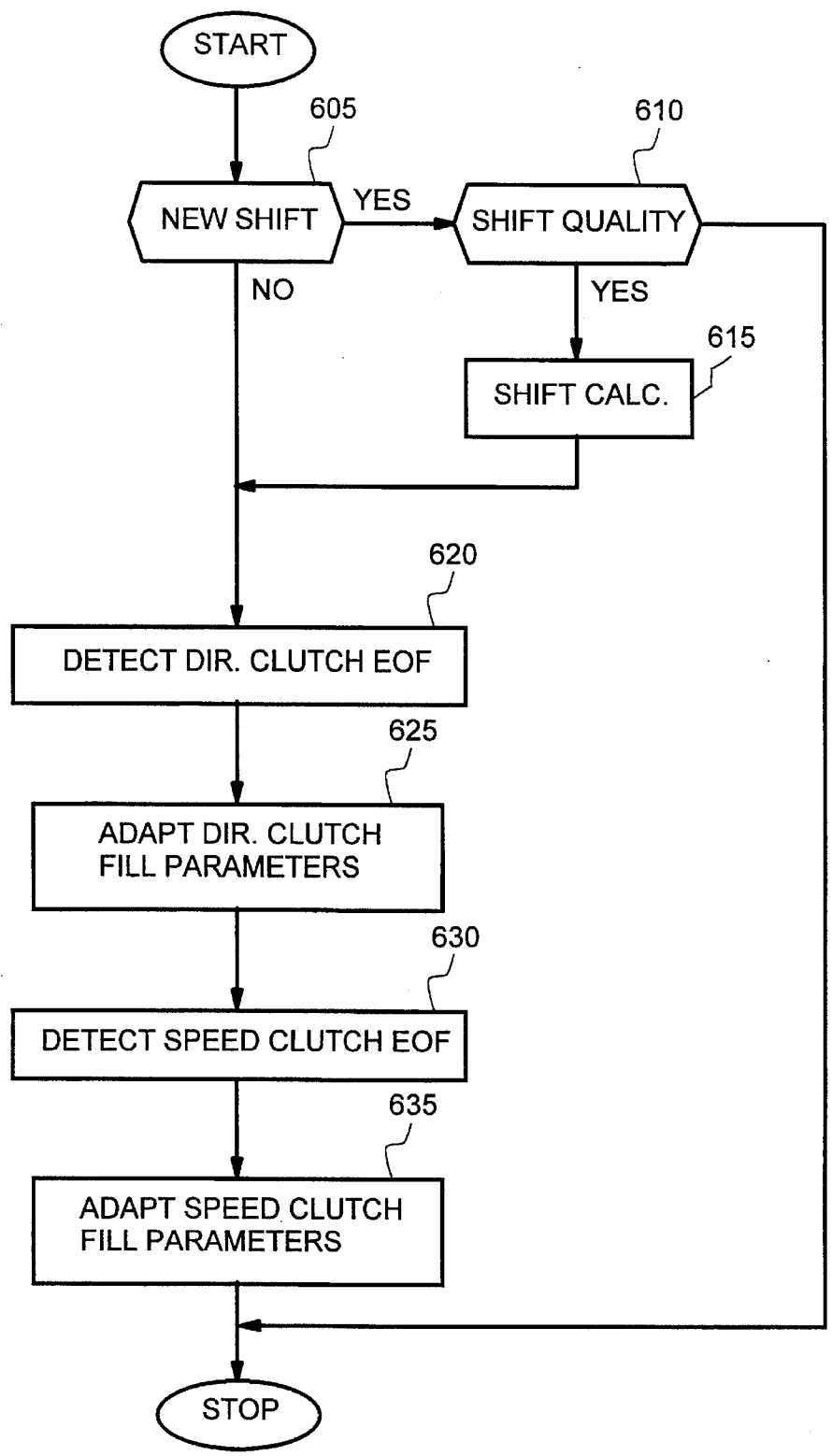
Fig_6_

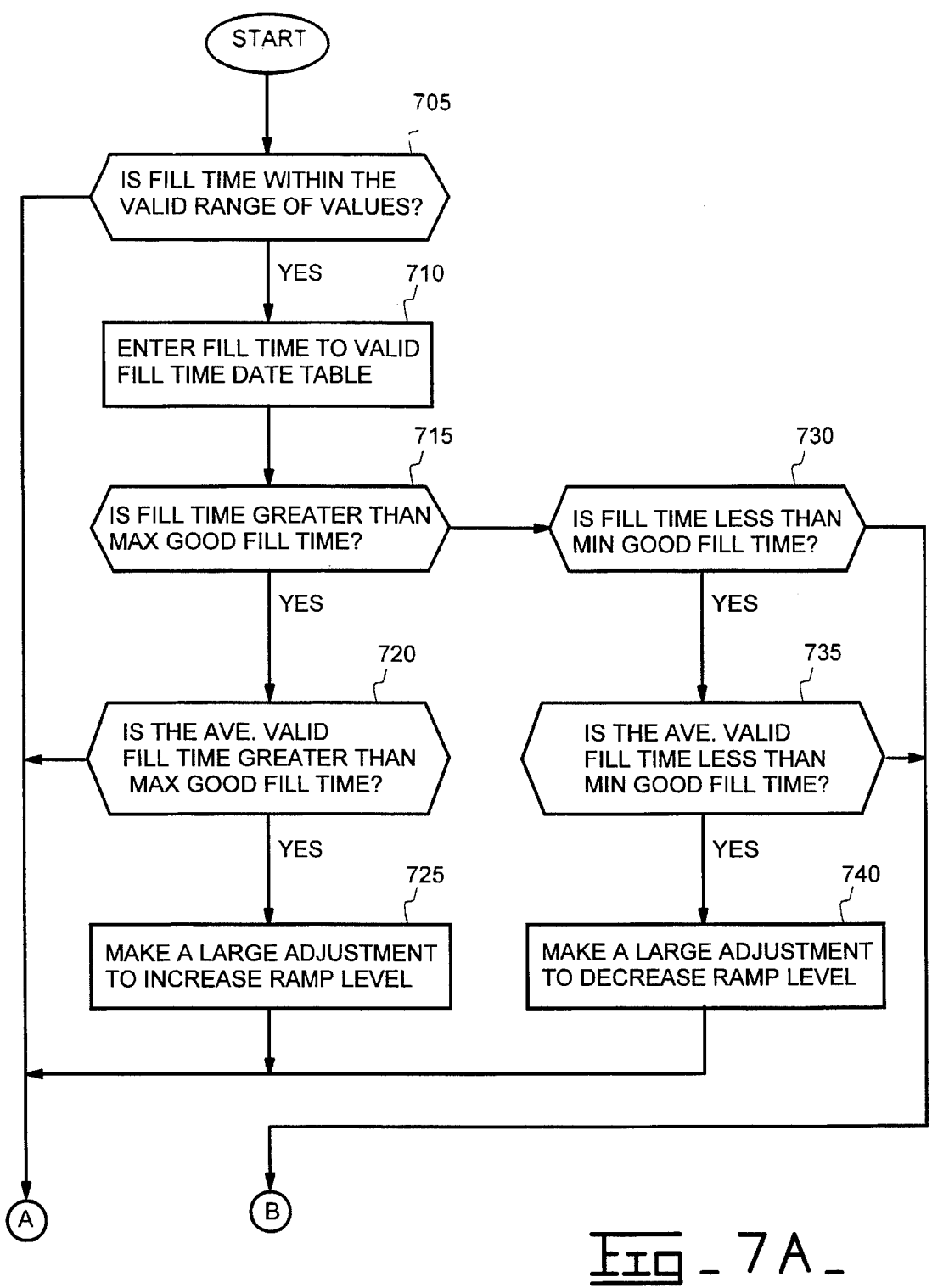
Fig_7A_

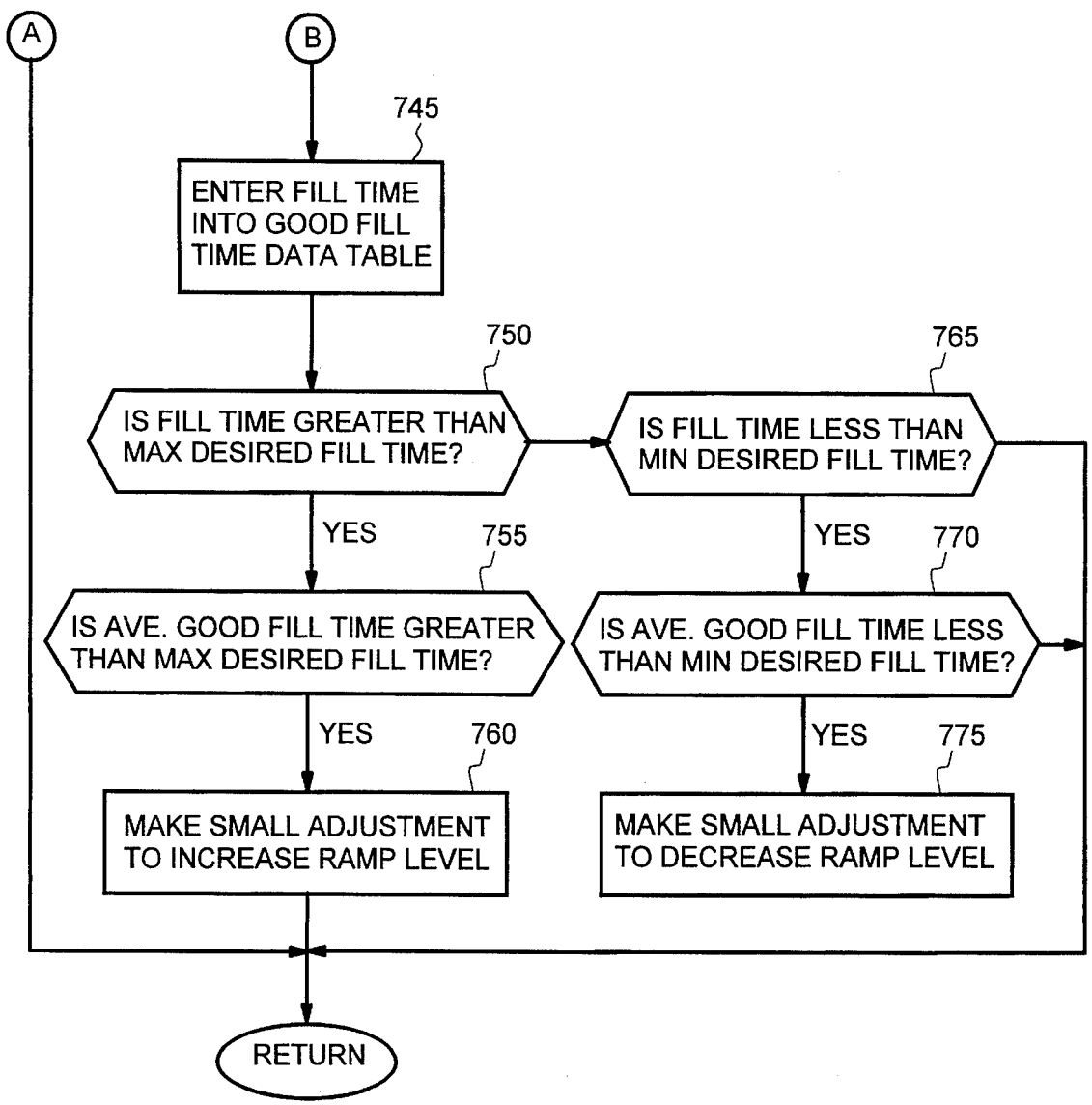
Fig_7B_

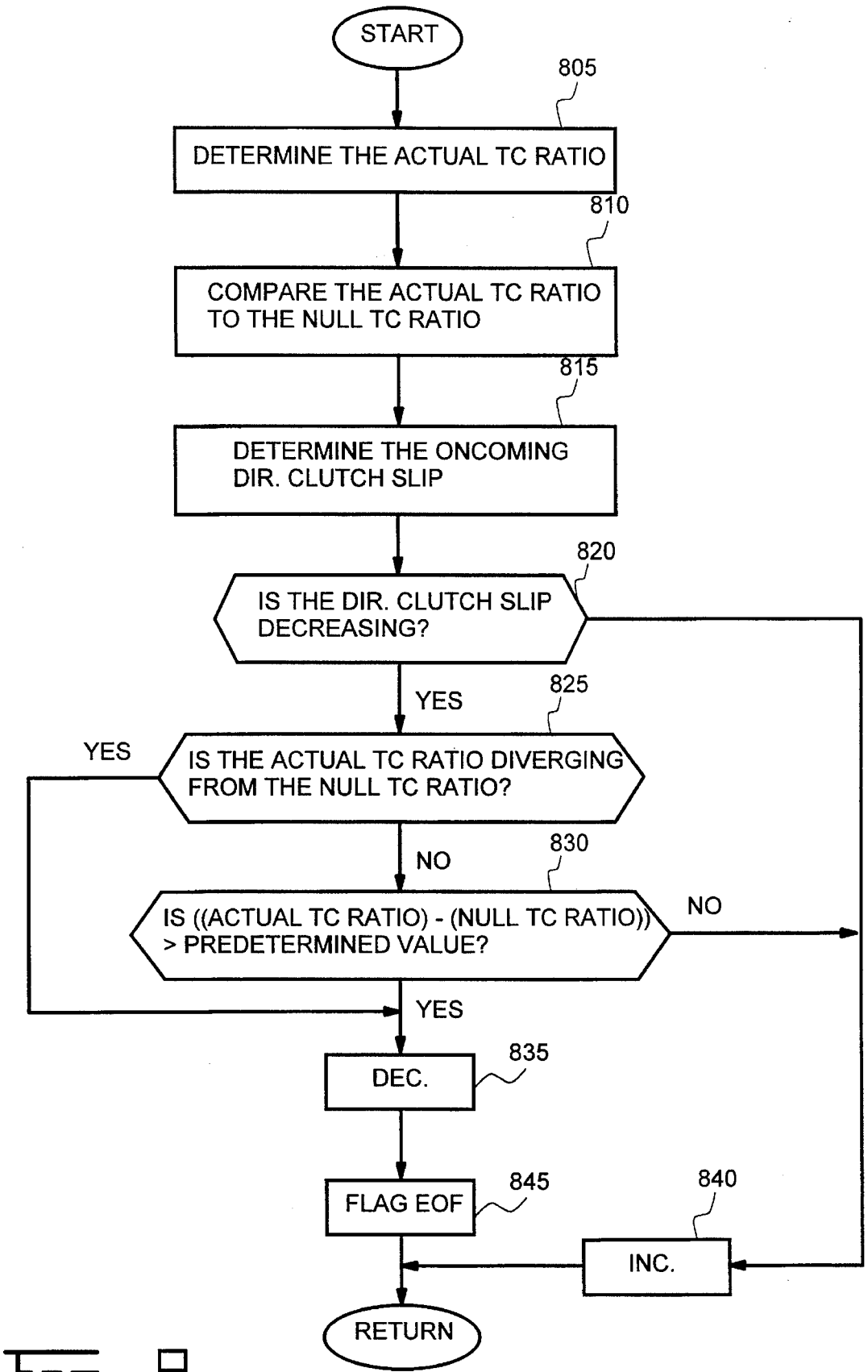
Fig-8-

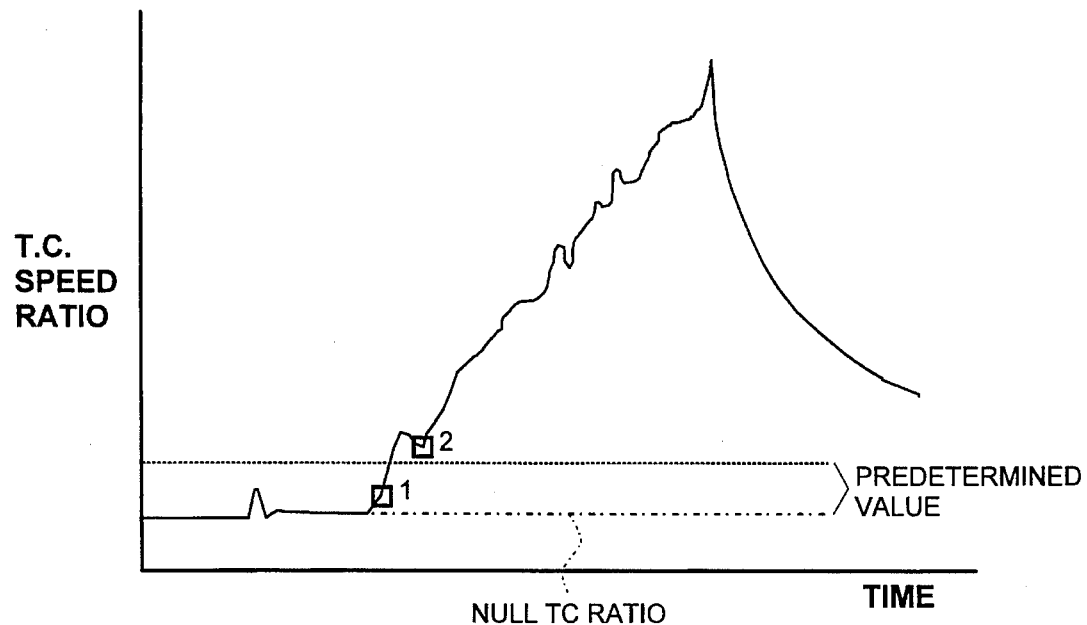
Fig_9A_
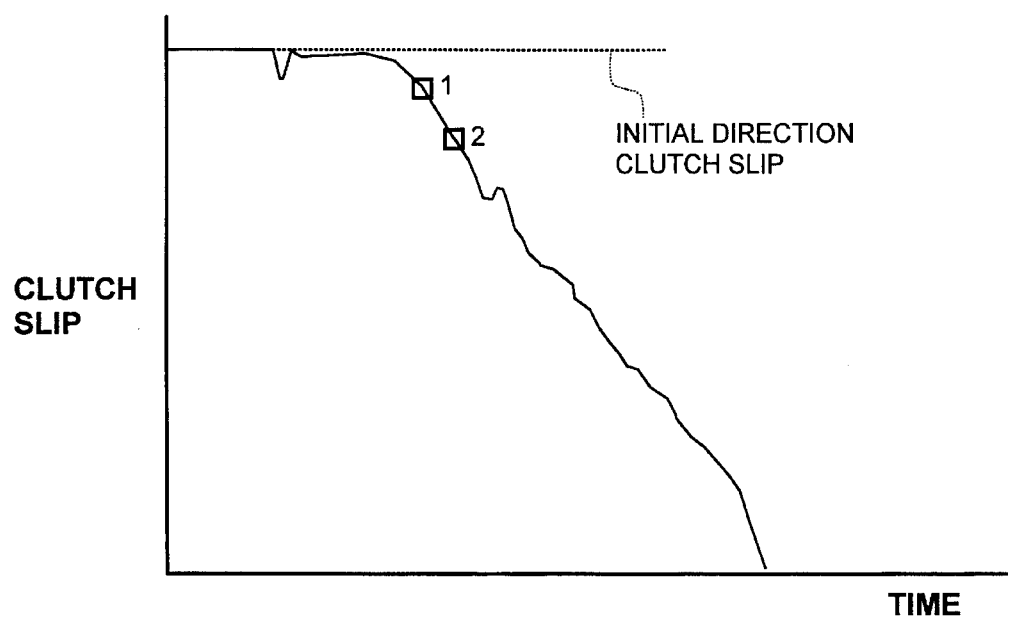
Fig_9B_

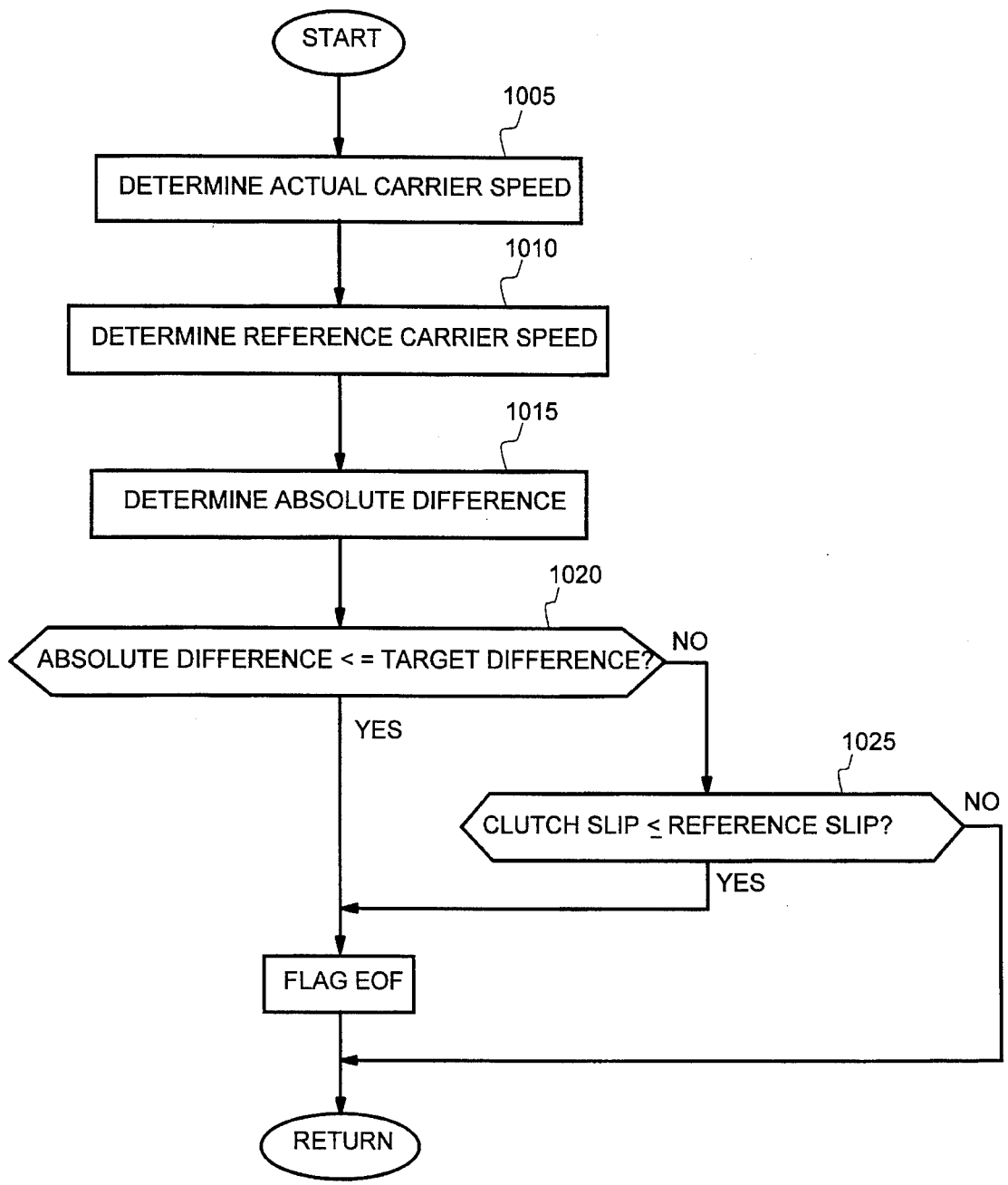
Fig-10-

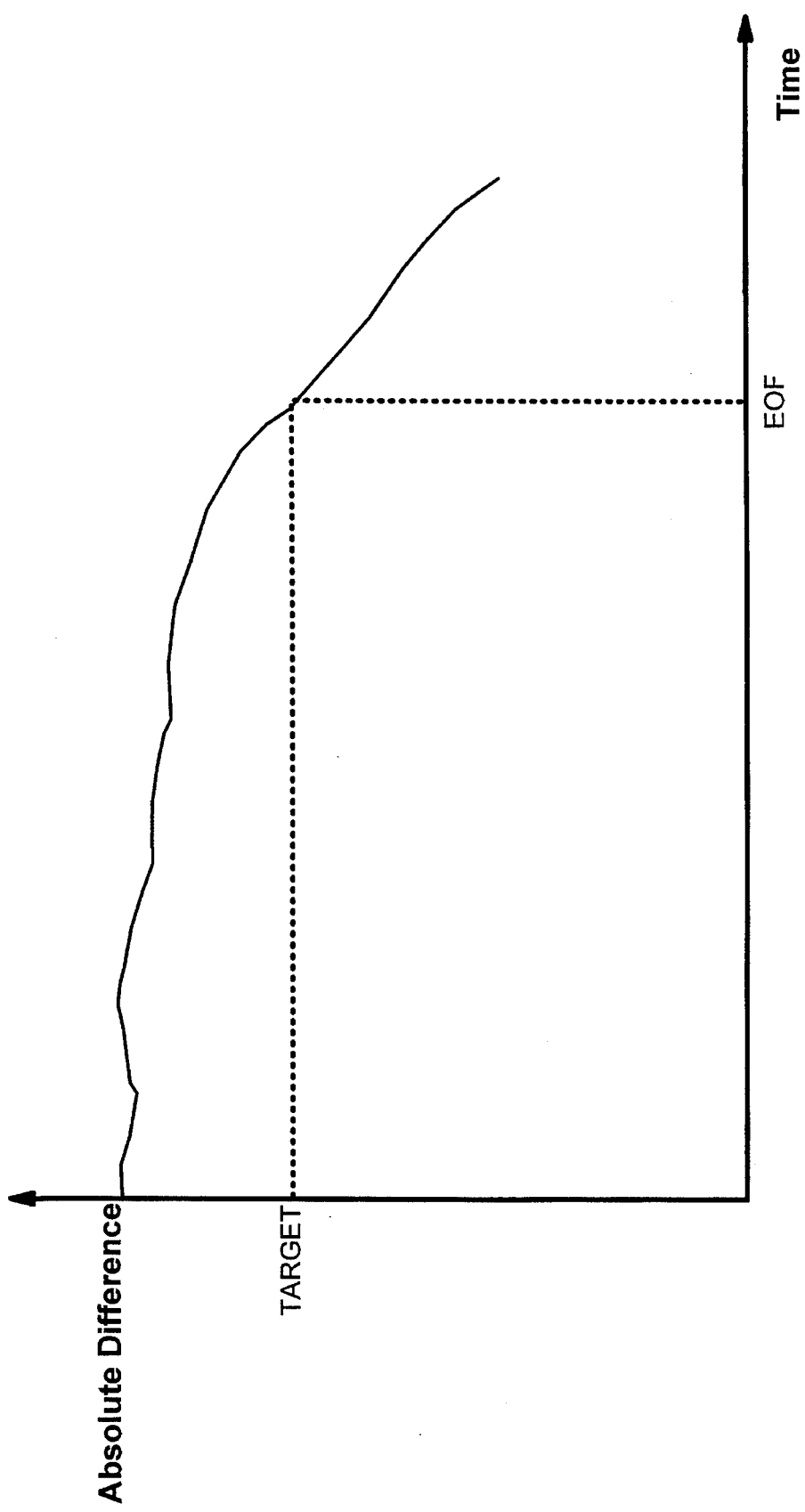
Fig-11-

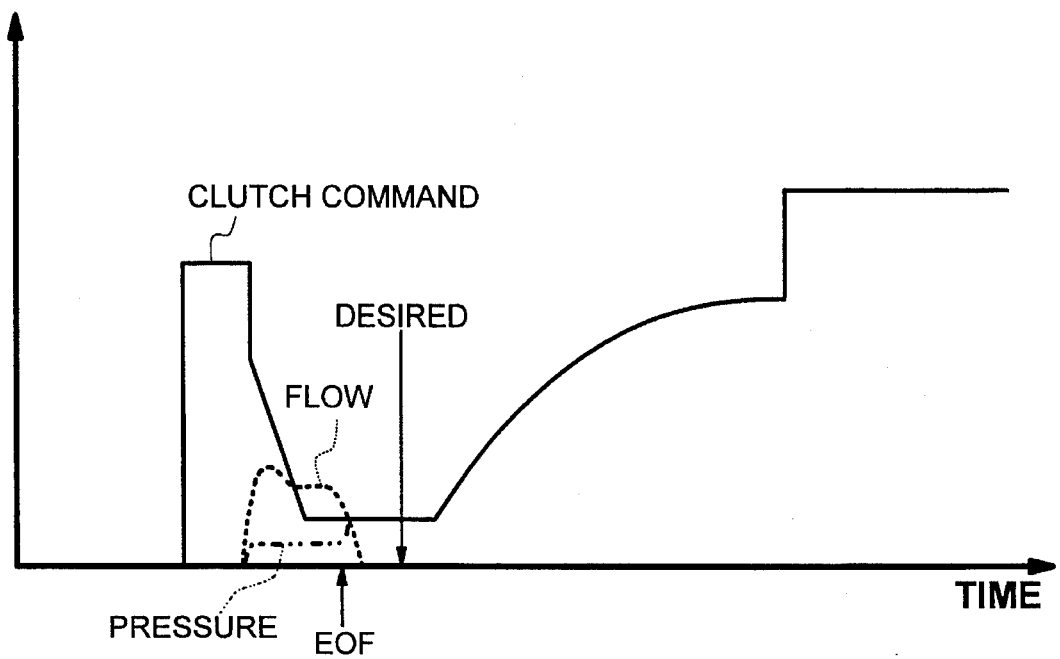
Fig_12A_
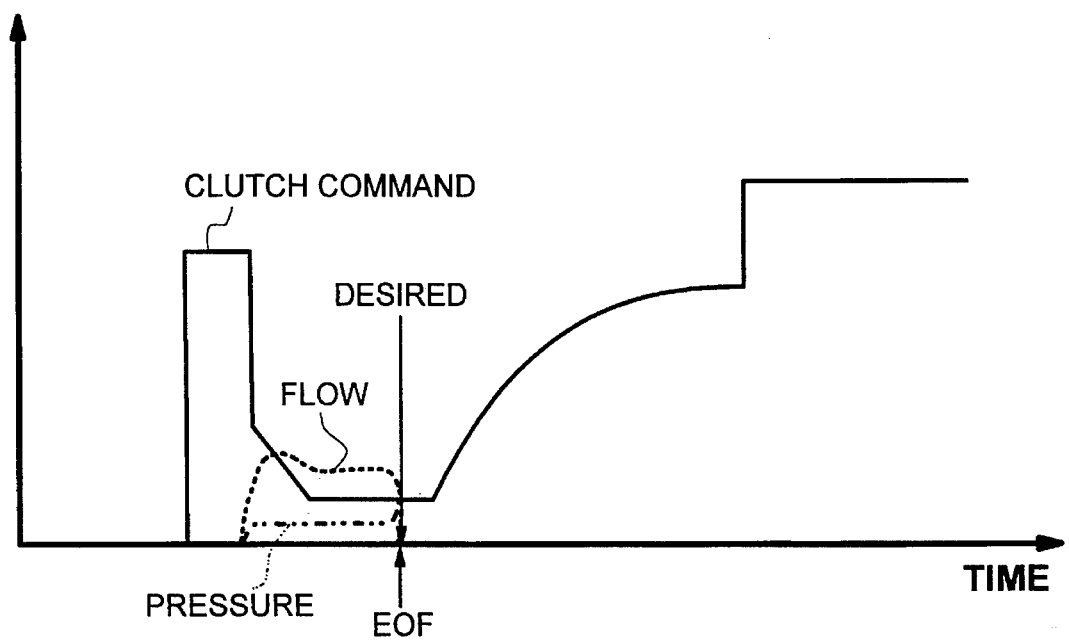
Fig_12B_

5,551,930

ADAPTIVE CONTROL METHOD FOR AN AUTOMATIC TRANSMISSION

TECHNICAL FIELD

This invention relates generally to a method of transmission control and, more particularly, to an adaptive method of adjusting shift parameters on the basis of the time required to fill an engaging clutch.

BACKGROUND ART

Generally, a powershift transmission includes a number of gear elements coupling the input and output shafts, and a related number of clutches which are selectively engageable to activate gear elements for establishing a desired speed ratio between the input and output shafts. The clutch may be of the band or disk type.

For example, the input shaft may be connected to the engine through a fluid coupling, such as a torque converter, and the output shaft is connected directly to the vehicle drive. Shifting from one gear ratio to another involves releasing or disengaging the off-going clutches associated with the current gear ratio and applying or engaging the on-coming clutches associated with the desired gear ratio.

To improve the shifting of the transmission, several transmission manufactures have utilized electronic control technology. Electronic control technology employs a direct interface between an electronic control unit and the clutches via a plurality of solenoid valves. The solenoid valves are modulated to control both the on-coming and off-going clutch pressures in response to command signals from the electronic control unit.

To provide for precise timing of the shifting, the clutch fill parameters for the on-coming clutch must be determined at the start of each shift. The accuracy of the fill parameters determines the quality of the resulting shift. However, due to manufacturing tolerances of the transmission components and differences in engine power for each application, the timing for each shift will be different. Thus, an adaptive control method is desired to automatically adjust the fill parameters in order to produce an optimal shifting transmission.

DISCLOSURE OF THE INVENTION

In one aspect of the present invention, an adaptive control method to control the shifting of an automatic transmission is disclosed. The method includes the steps of:

(a) commanding a predetermined clutch to fill in accordance with a plurality of clutch fill parameters;

(b) determining the actual time to completely fill the clutch;

(c) comparing the actual fill time with a predetermined fill time; and (d) adjusting at least one of the plurality of clutch fill parameters in response to the comparison in order to modify the clutch fill period during subsequent shifts to the predetermined clutch.

BRIEF DESCRIPTION OF THE DRAWINGS

For a better understanding of the present invention, reference may be made to the accompanying drawings in which:

FIG. 1 is a block diagram of an electronic control system of a vehicle drive train including a transmission;

FIGS. 2A, 2B are block diagrams illustrating respective embodiments of a transmission configuration;

FIGS. 3A, 3B, 3C are timing charts illustrating clutch commands for various types of transmission shifts;

FIG. 4 is timing diagram that relates the clutch fill parameters of clutch command to the clutch fill time;

FIG. 5 is diagram that relates the change in an initial ramp level of the clutch fill parameters to the clutch fill time;

FIG. 6 is a top level flowchart of the program control for an executive program;

FIGS. 7A, 7B are low level flowcharts of the program control for an adapting algorithm;

FIG. 8 is a low level flowchart of the program control of an end of fill detecting algorithm for an on-coming direction clutch;

FIGS. 9A, 9B are timing diagrams that show a torque converter ratio and clutch slip for on-coming direction clutch;

FIG. 10 is a low level flowchart of the program control of an end of fill detecting algorithm for an on-coming speed clutch;

FIG. 11 is a timing diagram that shows the result of a difference between an actual carrier speed and a reference carrier speed; and FIGS. 12A, 12B show a timing diagram of a clutch command for an on-coming clutch.

BEST MODE FOR CARRYING OUT THE INVENTION

Figure 2A:
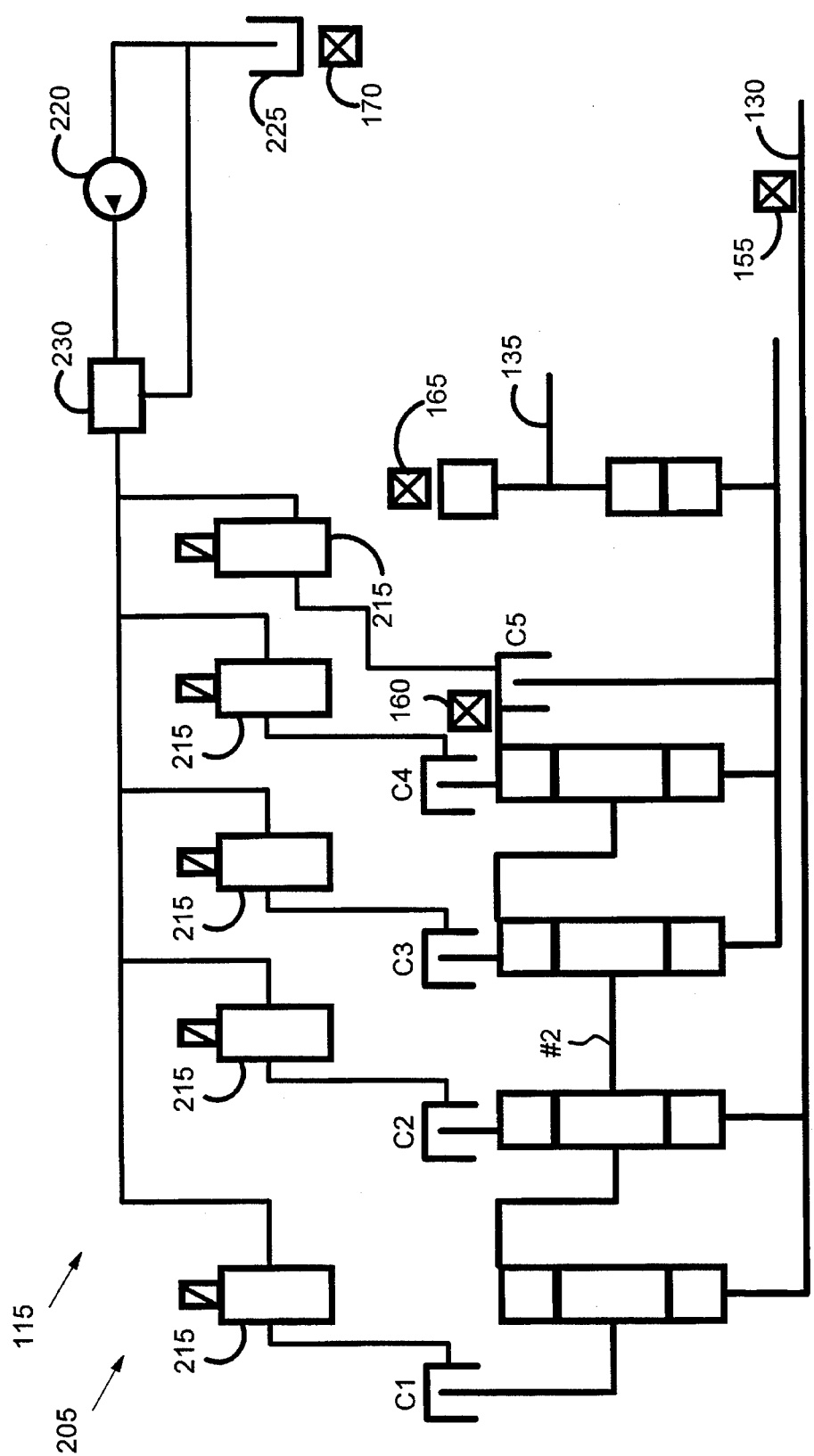

Referring now to the drawings, FIG. 1 illustrates a electronic control system of a power train 100 that includes an internal combustion engine 105, a fluidic torque converter 110, a multi-speed fluid operated power transmission 115, and a vehicle drive train 120. The engine 105 is connected to the torque converter 110 via shaft 125, the torque converter 110 is connected to the transmission 115 via shaft 130, and transmission 115 is connected to the vehicle drive 120 via shaft 135.

Referring now to FIGS. 2A, 2B, a block diagram of two transmission gear sets are shown. For example, FIG. 2A represents a track-type tractor transmission gear set 205, and FIG. 2B represents a wheeled vehicle transmission gear set 210. The transmission of FIG. 2A includes five clutches, where C1 is a reverse direction clutch, C2 is a forward direction clutch and clutches C3–C5 are speed clutches. The transmission of FIG. 2B includes six clutches, where C1 is a reverse direction clutch, C2 is a forward direction clutch and clutches C3–C6 are speed clutches. Gear shifts are accomplished by selectively engaging and disengaging combinations of the clutches. The clutches are actuated by hydraulic pressure and upon engagement, require fill time before torque is transmitted between a driving and a driven friction element. That is, the fill time is the elapsed time that the clutch piston moves from the released to the engaged position. The clutches are selectively engaged and disengaged by solenoid operated proportional pressure control valves 215. The hydraulic circuit of the transmission includes a positive displacement pump 220 that supplies pressurized hydraulic fluid from the sump or reservoir 225 to the clutches through the control valves 215. Moreover, a relief valve 230 may be added to regulate the valve supply pressure.

Referring back to FIG. 1, the control portion of the power train will now be discussed. An operator initiates a desired shift via an operator shift handle 140, which produces a gear selection signal. An electronic control module 147 receives the gear selection signal and responsively controls the operation of the solenoid control valves 215. The electronic control module 147 may also receive various other input signals representative of vehicle system parameters. Such other inputs signals may include a neutralizing signal from a neutralizer pedal 145, an engine speed signal from an engine speed sensor 150, an transmission input speed signal, $T_I$, from a transmission input speed sensor 155, a transmission intermediate speed signal, $T_N$, from a transmission intermediate speed sensor 160, a transmission output speed signal, $T_O$, from a transmission output speed sensor 165, and a transmission oil temperature signal from a transmission oil temperature sensor 170. The sensors are conventional electrical transducers such as potentiometer, thermistors and/or magnetic speed pickups.

Note that, although the intermediate speed sensor 160 is shown adjacent clutch C4, the intermediate speed sensor 160 may be adapted to sense the rotational speed of any one of the clutches or ring gears in the illustrated transmissions. The transmission speed signals are helpful to determine the individual rotational speeds of any one clutch or ring gear. For example, the clutch slip of any one of the speed clutches may be determined in response to the transmission output and intermediate speed signals. Additionally, the clutch slip of any one of the direction clutches may be determined in response to the transmission input and intermediate speed signals. Such determinations are based on the specific gear ratios of the transmission in a manner well known in the art.

Internally, the electronic control module 147 comprises a number of conventional devices including a microprocessor with an internal clock and memory, an input/output device, and an array of proportional solenoid current drivers. One solenoid driver are dedicated to each solenoid control valve 215. The microprocessor delivers a command signal proportional to the desired solenoid current, and the current driver uses a Pulse Width Modulated voltage to produce the desired current. The solenoid control valves 215 are configured to maintain a flow of oil to the clutch sufficient to maintain a clutch pressure proportional to the solenoid current. Thus, the microprocessor can control the clutch pressure proportional to the command signal delivered to the solenoid driver circuit. Proportional solenoid current drivers are well known in the art, and need not be further discussed.

The microprocessor utilizes arithmetic units to control the transmission shifting in accordance with software programs. Typically, the programs are stored in read-only memory, random-access memory or the like. The programs are discussed in relation to various flowcharts.

The clutch commands that control the various types of shifts are shown with respect to FIGS. 3A, B, C. Note that the direction clutch is used to absorb the majority of the torque transmitted by the shift. Thus, the direction clutch is the last clutch to be fully engaged in a shift. For example, in the case of a speed shift, only after the on-coming speed clutch is fully engaged, will the direction clutch be re-engaged.

A speed shift is shown in relation to FIG. 3A. The clutch command, which controls the clutch pressure, is shown with respect to time. The on-coming speed clutch enters a pulse, ramp and hold phase. As shown, the on-coming clutch command is pulsed at a high level for a predetermined amount of time to quickly open the solenoid control valve in order to begin filling the clutch. Then the clutch command is ramped to accurately control the fluid flow to the clutch. Finally the clutch command is maintained at a hold level to completely fill the clutch. The value of the hold level is high enough to insure completion of clutch fill, yet low enough to prevent excessive torque transmission when the clutch plates "touch-up." After the on-coming clutch is filled, the on-coming clutch enters a modulation phase. The corresponding clutch command is controlled either closed-loop or open-loop to gradually increase the clutch pressure in order to cause a desired decrease in clutch slip. Once the on-coming clutch locks-up or engages, the clutch command is increased to a maximum pressure level.

The off-going speed and direction clutch commands are decreased to a low pressure level for a predetermined time period before the on-coming speed clutch is modulated. The predetermined time period is set to allow for end of fill detection and to reduce torque interruption.

Once the on-coming speed clutch is engaged, the direction clutch then enters a modulation phase. Once the direction clutch is engaged, then the clutch command is increased to a maximum pressure level to complete the shift.

Note that the end-of-fill of the on-coming clutches may be determined by various methods; including: dedicated end-of-fill detection sensors, timing methods or other known end-of-fill detection methods. Additionally, clutch lock-up may be indicated by monitoring clutch slip.

A direction shift is shown in relation to FIG. 3B. Here, the speed clutch command remains unchanged while the direction clutch command is modified. The on-coming direction clutch command is pulsed, then ramped down to a hold level to fill the clutch. The off-going direction clutch pressure is decreased to a low pressure level a predetermined time before the on-coming direction clutch enters the modulation phase. The modulation phase uses a closed-loop pressure control to result in a desired decrease in clutch slip. Once the on-coming clutch locks-up, then the clutch command is increased to a maximum pressure level to complete the shift.

A combination or direction and speed clutch shift is shown in relation to FIG. 3C. The on-coming speed clutch command is pulsed and ramped down to a hold level in order to fill the clutch. After the on-coming speed clutch is filled, the clutch command is modulated until the clutch locks-up, then increased to a maximum command level to fully engage the clutch. However, a predetermined time period prior to the on-coming speed clutch entering the modulation phase, the off-going speed and direction clutch commands are decreased to release the clutches. Moreover, a predetermined time period after the on-coming speed clutch begins filling, the on-coming direction clutch command is pulsed then ramped down to a hold level in order to fill the clutch. The on-coming direction clutch command is then modulated after the on-coming speed clutch is engaged. Once the on-coming direction clutch locks-up, the clutch command is increased to a maximum level to fully engage the clutch to complete the shift.

The present invention is directed to adapting the clutch fill parameters of the clutch command to respond to slow changing flow requirements due to normal clutch wear, as well as, to respond to rapid changing flow requirements due to: a minor failure, such as a bad seal or a rebuilt transmission. Consequently, the electronic control module maintains two software lockup tables for a finite number of fill times for each clutch. One of the lockup tables is referred to as the "valid" fill time table, and the other lockup table is referred to as the "good" fill time table. The "valid" fill time table is used to adjust the clutch fill parameters for rapid changing flow requirements. The "good" fill time table is used to adjust the clutch fill parameters for slow changing flow requirements. Moreover, when the electronic control module adds a value to one the tables, the module determines an average value of the fill times that are contained in the table. Thus, a running or accumulated average of fill times are determined for each table.

The present invention adapts the clutch fill parameters of a predetermined clutch for a subsequent shift based on the magnitude of the clutch fill period of a prior shift. The clutch fill period represents the time period in which the predetermined clutch completely fills, and is referred to as the actual fill time as shown in FIG. 4. Thus, in order to determine the actual fill time, the end-of-fill (EOF) for the predetermined clutch must be detected. Once the actual fill time is determined, the present invention compares the actual fill time to a valid range of fill times, and modifies or adjusts the ramp level of the clutch fill pulse in order to fill the predetermined clutch at a desired fill time.

The relationship between the actual fill time and the change in ramp level is shown with reference to FIG. 5. It is understood that each clutch has unique clutch fill parameters which may be subsequently modified.

The following illustrates how the present invention modifies the clutch fill parameters in response to the actual fill time. First, the present invention determines the actual fill time and compares the actual fill time to a valid range of fill times. If the actual fill time falls outside a "valid" range of fill times, the actual fill time is not used to modify the clutch fill parameters. Under this condition, it is assumed that there was an error in the EOF detection of the on-coming clutch. However, if the actual fill time falls inside a range of "reasonable" fill times, then the actual fill time is placed in the "valid" fill time data table. Moreover, if the actual fill time falls inside a range of "good" fill times, then the actual fill time is additionally placed in the "good" fill time data table.

If the actual fill time falls in a range of "reasonable" fill times, but not in a range of "good" fill times, then a test is made to determine if there has been a consistent trend of fill times associated with the "valid" fill time data table that have been occurring outside the range of "good" fill times—indicating a large, sudden change in the flow requirements to fill the clutch. This test determines if the actual fill time, as well as, the average fill time associated with the "valid" fill time data table are within the range of "good" fill times; and if not, then "large" adjustments are made to the clutch fill parameters of the predetermined clutch.

If the actual fill time falls within a range of "good" fill times, then a test is made to determine if there has been a consistent trend of fill times associated with the "good" fill time data table that have been drifting from the "desired" range of fill times—indicating normal transmission wear. This test determines if the actual fill time, as well as, the average fill time associated with the "good" fill time data table are within the "desired" range of fill times; and if not, then "small" adjustments are made to the clutch fill parameters of the predetermined clutch.

FIGS. 6 to 8 and 10 are flowcharts representative of computer program instructions executed by the computer-based control unit of FIG. 1 in carrying out the shift control technique of the present invention. In the description of the flowcharts, the functional explanation marked with numerals in angle brackets, <nnn>, refers to blocks bearing that number.

Reference is now made to FIG. 6, which represents an executive or main loop program of the adapting control, which directs the sequential execution of various subroutines. The program first determines whether a new gear has been selected <605> and whether the new shift satisfies certain conditions <610>. For example, whether the vehicle travel speed is above a predetermined value and whether the shift represents a predetermined type of shift that is amenable to end of fill detection. If the shift qualifies, then the program control determines the values of several variables used in the various subroutines, including: COUNTER, TARGET VALUE, and the initial direction associated with a clutch slip value of a predetermined on-coming direction clutch. These variables will be discussed in more detail below. Moreover, the parameters associated with the clutch command will be initialized, including: the pulse level (magnitude) and time (width), the initial ramp level and time, and hold level and time. It is noted that, the ramp level/time and hold level/time are unique to the specific clutch, while the pulse level/width are the same for each clutch.

While a direction shift in is progress, the program control detects the end of fill (EOF) of a predetermined on-coming direction clutch and determines the corresponding or actual fill time <620>. For example, several EOF detection methods may be performed including those that utilize dedicated EOF detection sensors. Once the actual fill time has been determined, the program control adapts the fill parameters of the predetermined direction clutch based on the magnitude of the actual fill time <625>. Next, while a speed shift in is progress, the program control detects the EOF of a predetermined on-coming speed clutch and determines the corresponding or actual fill time <630>. Once the actual fill time has been determined, the program control adapts the fill parameters of the predetermined speed clutch based on the magnitude of the actual fill time <635>.

The adapting algorithm subroutine will now be discussed with reference to FIGS. 7A, 7B, which show the corresponding program control. As will be described, the adapting algorithm subroutine adjusts or adapts the shift parameters of a predetermined clutch based on a prior shift to the predetermined clutch. Accordingly, the adapting algorithm subroutine adjusts the shift parameters of a predetermined clutch to accurately control the flow of fluid to the clutch in order to improve shift quality. It is to be understood that the program control for the both the direction clutches and speed clutches are the same.

First, the program control determines if the actual fill time of a predetermined clutch is within a "valid" range of fill times. For example, the program control determines if the actual fill time is greater than the minimum "valid" fill time and less than the maximum "valid" fill time. If the actual fill time is outside the "valid" range, then the actual fill time is discarded and no further action is taken with respect to the discarded fill time. But if the actual fill time is within the "valid" range, then the program control enters the actual fill time into the "valid" fill time data table and determines a "running" average of the stored fill times <710>.

If the actual fill time is greater than the maximum "good" fill time <715> and the average "valid" fill time is greater than the maximum "good" fill time <720>, then a large adjustment is made to increase the initial ramp level for a subsequent shift to the predetermined clutch in order to adjust the actual fill time toward the "desired" range <725>. Moreover, if the actual fill time is less than the minimum "good" fill time <730> and the average "valid" fill time is less than the minimum "good" fill time <735>, then a large adjustment is made to decrease the initial ramp level for a subsequent shift to the predetermined clutch in order to adjust the actual fill time toward the "desired" range <740>.

However, if the actual fill time or the average "valid" fill time within the range of "good" fill times, then the program control continues to "B" at the bottom of FIG. 7A and the top of FIG. 7B. Referring now to FIG. 7B, the program control first enters the actual fill time in the "good" fill time data table and determines a "running" average of the stored fill times <745>.

If the actual fill time is greater than the maximum "desired" fill time <750> and the average "good" fill time is greater than the maximum "desired" fill time <755>, then a small adjustment is made to increase the initial ramp level for a subsequent shift to the predetermined clutch in order to adjust the actual fill time toward the "desired" range <760>. But if the fill time is less then the minimum "desired" fill time <765> and the average "good" fill time is less than the minimum "desired" fill time <770>, then a small adjustment is made to decrease the initial ramp level for a subsequent shift to the predetermined clutch to adjust the actual fill time toward the "desired" range <775>. Consequently, if the actual fill time and the average "good" fill time is within the range of "desired" fill times, then no adjustments need be made.

The preferred end-of-fill (EOF) detection methods will now be discussed. The present invention utilizes two different methods to detect the EOF, depending upon whether the clutch being engaged is a speed clutch or a direction clutch. For example, the illustrated transmissions are designed such that the direction clutches are the energy absorbing clutches. Thus, during all shifts, the direction clutches are the last to be engaged. (This also includes speed shifts where the direction clutch is the same for both the offgoing gear and the oncoming gear.) Consequently, during a shift, the direction clutch fills, begins engaging, and begins transmitting torque between the transmission and the torque converter. Advantageously, the present invention monitors the output torque of the torque converter and when the output torque suddenly increases (indicating an upshift) or decreases (indicating a downshift), EOF of the direction clutch is said to occur. The present invention monitors the torque converter output torque by determining a speed ratio of the torque converter and comparing the torque converter speed ratio to a reference value.

Referring now to FIG. 8, the EOF detection strategy for the direction clutch is discussed. The program control first determines the actual torque converter ratio by dividing the torque converter output speed by the torque converter input speed <805>; then, determines the difference between the actual torque converter ratio and a reference value referred to as the null torque convertor ratio <810>. The null torque converter ratio is defined as the torque converter ratio at which the torque converter output is zero. For example, the null torque converter ratio is based on well known torque converter output characteristic curves. The on-coming direction clutch slip is then determined <815> by using well known methods.

Two tests are made to determine if the EOF has occurred. The first consists of two parts (1) determining if the absolute value of the direction clutch slip is approaching zero slip <820> and (2) determining if the torque convertor ratio is diverging from the null torque ratio <825>. If both parts are true, then EOF is said to have occurred because the above conditions indicate that the on-coming direction clutch is transmitting significant torque.

This is better illustrated with reference to FIGS. 9A and 9B, where FIG. 9A shows the torque convertor ratio and FIG. 9B shows the clutch slip relative to time. At point 1, the torque converter speed ratio is shown to be diverging or moving away from the null toque converter ratio, while the clutch slip is shown to be decreasing.

The second test also consists of two parts (1) determining if the direction clutch slip is decreasing <820> (as referenced to the initial direction clutch slip) and (2) if the magnitude difference between the actual torque converter ratio and the null torque convertor ratio is greater than a predetermined value. If both parts are true, EOF has already occurred. For example, this is shown by point 2 on FIGS. 9A, 9B.

It is noted that the waveforms illustrated on FIGS. 9A, 9B are in simplified form. The actual waveforms will have varying degrees of fluctuations. Consequently, it may be desirable to perform the subroutine shown in FIG. 8 several times to ensure that EOF has occurred. For example, in the executive routine, the program control sets COUNTER equal to five. If decision blocks 825 and 830 indicate EOF, then COUNTER is decremented by one. Consequently, once COUNTER is decremented to zero, then EOF is flagged <845>. However, if decision blocks 820 and 830 indicate that EOF has not occurred, then COUNTER is incremented by one.

The EOF detection for an on-coming speed clutch will now be discussed. The EOF detection strategy uses the occurrence of one event to help determine the occurrence of another event. Here, the release of an off-going speed clutch signifies the EOF of an on-coming speed clutch. For example, once an on-coming speed clutch fills, the clutch pressure rises engaging the clutch, which in turn, causes the clutch to begin transmitting torque. This transmitted torque causes the off-going speed clutch to release (due to the low clutch pressure).

One method to determine whether an off-going speed clutch has released is to monitor the slip of that clutch. For example, an engaged clutch will not normally slip; but, when the clutch pressure is lowered, the clutch will begin to slip. Consequently, once the engaged clutch begins to slip, that clutch is said to be released. Thus, once the slip of an off-going speed clutch becomes greater than a reference slip value, then EOF of an on-coming speed clutch is said to occur.

Another method to determine whether an off-going speed clutch has released is to monitor the speed of the carrier that connects the direction clutch stage to the speed clutch stage. For example, referring to FIGS. 2A and 2B, the illustrated transmission consists of essentially two stages where the #2 carrier connects the direction clutch stage to the speed clutch stage. During a speed shift, the #2 carrier initially rotates at a speed associated with the off-going speed clutch, then eventually rotates at a speed associated with the on-coming speed clutch. Consequently, once the on-coming speed clutch substantially fills, the clutch begins to transmit torque; and the #2 carrier speed changes from the speed associated with the off-going speed clutch to the speed associated with the on-coming speed clutch —at a rate proportional to the torque that is produced by the on-coming clutch. It is at this initial change in speed that indicates EOF of the on-coming speed clutch.

In view of this, the present invention compares the actual #2 carrier speed with a reference carrier speed. The reference carrier speed represents the carrier speed as if the on-coming speed clutch were completely engaged. Once the difference between the two speeds is less than a predetermined target value, then EOF is said to occur.

Based on the planetary gear relationship of the #3 clutch, the actual #2 carrier speed is determined in accordance with the following equation:

$$\text{carrier speed} = \text{output speed} + (N_R/N_S)*\text{\#3 clutch slip}/(1+(N_R/N_S)) \quad \text{Eq.1}$$

where:

$N_R$=the number of teeth of the clutch #3 ring gear;

$N_S$=the number of teeth of the clutch #3 sun gear; and the #3 clutch slip is the ratio of the input clutch speed/output clutch speed.

The EOF detection strategy for the speed clutch is shown with reference to FIG. 10. The program control determines the actual carrier speed <1005>, a reference carrier speed <1010>, and determines the absolute value of the difference between the actual and reference speeds <1015>. The actual carrier speed is determined with respect to Eq. 1 and the reference carrier speed is determined according to the following equation:

$$\text{reference carrier speed} = \text{reduction speed ratio } [i] * \text{transmission output speed} \quad \text{Eq. 2}$$

where:

the reduction speed ratio [i] is the reduction speed ratio for the predetermined engaging speed clutch. It is noted that the reduction speed ratio is dependant upon the specific configuration of the transmission and is determined in a manner well known in the art.

The program control determines whether the absolute difference between the actual and reference speeds is greater than TARGET <1020>. TARGET is determined at the start of the shift and its value is a predetermined percentage of the absolute difference between the actual and reference speeds determined at the start of shift. For example, TARGET may be 90% of the absolute difference between the actual and reference speeds determined at the start of shift. Thus, if the absolute difference between the actual and reference speeds is less than the target value, then EOF is said to have occurred. This is shown more particularly with reference to FIG. 11, where the absolute difference between the actual and reference speeds is shown with respect to time.

However, if the absolute difference between the actual and reference speeds is greater than the target value, then the program control determines if the clutch slip of the on-coming speed clutch is less than a reference slip value <1025>. The reference slip value represents some value below which the on-coming speed clutch is assumed to be engaged. Consequently, if the on-coming speed clutch has engaged (the on-coming clutch slip is less than the reference slip value), then EOF has already occurred.

Thus, while the present invention has been particularly shown and described with reference to the preferred embodiment above, it will be understood by those skilled in the art that various additional embodiments may be contemplated without departing from the spirit and scope of the present invention.

INDUSTRIAL APPLICABILITY

The present invention is advantageously applicable to controlling a clutch-to-clutch shift of a powershift transmission of a construction machine such as a wheel loader, bulldozer, or the like. One such shift may be a speed shift that changes from one speed ratio to another speed ratio. A speed ratio is defined as the transmission input speed or torque converter speed divided by the output speed. Thus, a low gear range has a high speed ratio and a higher gear range has a lower speed ratio. To perform an upshift, a shift is made from a high speed ratio to a low speed ratio. In the type of transmission involved in this invention, the upshift is accomplished by disengaging a clutch associated with the higher speed ratio and engaging a clutch associated with the lower speed ratio to thereby reconfigure the gear set to operate at the lower speed ratio. With respect to a speed shift, such as an upshift, the direction clutch is used to absorb the torque created by the shift. Thus, during an upshift, the direction clutch is disengaged, then re-engaged after the on-coming speed clutch is engaged. In this manner the direction clutch absorbs the torque created during the shift.

The present invention controls the timing of the clutch-to-clutch shifts by adapting the clutch fill parameters of subsequent shifts based on past shifts in order to achieve high quality shifting. For example, at the start of each shift, the on-coming clutch command is pulsed at a high level for a predetermined period of time then the command is ramped down from a initial level to a hold level. Optimally, the initial ramp level is chosen to create a desired amount of fluid flow to quickly stroke the clutch piston and gain torque capacity of the on-coming clutch. However, if the end of fill occurs too early (the initial ramp level is set too high), the resulting clutch pressure causes the clutch to transmit torque to quickly, which results in a harsh shift. Alternately, if the end of fill occurs too late (the initial ramp level is set too low), the clutch does not achieve sufficient pressure until the modulation phase, which causes a sudden (rather than gradual) increase in clutch torque, which also results in a harsh shift. Advantageously, by monitoring the actual fill period of a predetermined clutch, the adaptive control can learn from past shifts and optimize subsequent shifts to the predetermined clutch.

Reference is now made to FIGS. 12A, B, which show an example of how the fill parameters for a predetermined clutch are modified. Referring to FIG. 12A, the clutch command pulses the predetermined clutch for a predetermined time period then the clutch command ramps down from an initial level to a hold level. The corresponding fluid flow and clutch pressure are also shown. Note that, most of the fluid flows to the clutch during the ramp phase. As shown, the illustrated ramp phase causes the clutch to fill too soon, causing the clutch to transmit torque too early in the shift thereby resulting in a harsh shift.

Accordingly, the control adapts the initial ramp level (the ramp time remains unchanged) based on a comparison of the actual fill time to a desired fill time. For example, the clutch command for a subsequent shift to the predetermined clutch is shown in FIG. 12B. Consequently, the adapting control lowers the initial ramp level by a predetermined amount (either a large or small amount) in order to lower the flow rate. Thus, the actual fill time is extended so that the EOF occurs at or near the desired fill time, which improves the quality of the shift.

The present invention not only improves the transmission shift quality, but simultaneously reduces wear on the drivetrain components and contributes to a longer drivetrain life. In addition, vehicle downtime due to poor transmission calibration will be virtually eliminated since the transmission will self-calibrate.

Other aspects, objects and advantages of the present invention can be obtained from a study of the drawings, the disclosure and the appended claims.

We claim:

1. A method for filling clutches with fluid, in a vehicle having an engine, a transmission, and a torque convertor for transmitting torque between the engine and transmission, the transmission comprising:

a plurality of speed changing clutches;

a plurality of direction changing clutches;

a plurality of pressure control valves individually connected to the clutches;

a hydraulic pump adapted to deliver pressurized hydraulic oil to the plurality of pressure control valves, predetermined ones of the pressure control valves metering hydraulic fluid to the clutches in response to receiving a clutch command signal in accordance with a method comprising the steps of:

commanding a pressure control valve of a predetermined clutch for a predetermined time period in order to fill the predetermined clutch in accordance with a plurality of clutch fill parameters;

determining the actual time to substantially fill the clutch, the actual time being indicative of a clutch fill period;

comparing the actual fill time with a predetermined fill time; and adjusting at least one of the plurality of clutch fill parameters in response to the comparison in order to modify the clutch fill period during subsequent shifts to the predetermined clutch.

2. A method, as set forth in claim 1, wherein the step of commanding the predetermined clutch to fill includes the steps of:

pulsing the predetermined clutch pressure control valve; thereafter ramping the predetermined clutch pressure control valve from an initial level down to a hold level; and maintaining the predetermined clutch pressure control valve at the hold level until the expiration of the predetermined time period.

3. A method, as set forth in claim 2, wherein the step of adjusting the fill parameters includes the step of adjusting the initial ramp level of the clutch command in order to control the amount of fluid flow to the predetermined clutch.

4. A method, as set forth in claim 3, wherein the predetermined fill time comprises a range of fill times that includes:

a desired range of fill times indicative of predetermined periods in which it is desirous to completely fill the clutch;

a good range of fill times, which are greater in magnitude than the desired range of fill times;

a reasonable range of fill times, which are greater in magnitude than the good range of fill times; and a valid range of fill times, which includes the desired, good, and reasonable range of fill times.

5. A method, as set forth in claim 4, including the steps of comparing the actual fill time to the range of valid fill times, and storing the actual fill time in a valid fill time data table in response to the actual fill time being within the range of valid fill times.

6. A method, as set forth in claim 5, including the steps of comparing the actual fill time to the range of good fill times, and storing the actual fill time in a good fill time data table in response to the actual fill time being within the range of good fill times.

7. A method, as set forth in claim 6, including the steps of determining the average fill time of the stored fill times contained in the valid fill time data table, and determining the average fill time of the stored fill times contained in the good fill time data table.

8. A method, as set forth in claim 7, including the step of making a large adjustment to the initial ramp level in response to the actual fill time being within the range of reasonable fill times but not within the range of good fill times, and the average fill time associated with the valid fill time data table being within the range of reasonable fill times but not within the range of good fill times.

9. A method, as set forth in claim 8, including the steps of making a small adjustment to the initial ramp level in response to the actual fill time being within the range of good fill times but not within the range of desired fill times, and the average fill time associated with the good fill time data table being within the range of good fill times but not within the range of desired fill times.

10. A method, as set forth in claim 1, wherein the step of determining the actual fill time of an on-coming speed clutch includes the step of determining when the on-coming speed clutch substantially fills.

11. A method, as set forth in claim 10, wherein the step of determining when the on-coming speed clutch substantially fills includes the step of monitoring the release of an off-going speed clutch.

12. A method, as set forth in claim 11, wherein the step of monitoring the release of an off-going speed clutch, includes the steps of:

determining the actual speed of a predetermined transmission carrier gear;

determining a reference speed;

determining the difference between the actual speed and the reference speed;

comparing the speed difference to a target value; and determining when the on-coming speed clutch has substantially filled in response to the speed difference being less than the target value.

13. A method, as set forth in claim 1, wherein the step of determining the actual fill time of an on-coming direction clutch includes the step of determining when the on-coming direction clutch substantially fills.

14. A method, as set forth in claim 13, wherein the step of determining when an on-coming direction clutch substantially fills includes the step of determining when the torque converter output torque suddenly changes.

15. A method, as set forth in claim 14, wherein the step of determining when the torque converter output torque suddenly changes, includes the steps of:

monitoring the torque converter input speed and output speed;

determining a torque converter speed ratio in response to the torque converter input speed and output speed;

comparing the torque converter speed ratio to a reference value; and determining when the on-coming direction clutch substantially fills in response to the comparison.

16. A method, as set forth in claim 13, wherein the step of determining when an on-coming direction clutch substantially fills includes the step of monitoring the slip of the on-coming direction clutch.

17. A method, as set forth in claim 16, wherein the step of monitoring the slip of the on-coming direction clutch, includes the steps of:

determining the clutch slip of the on-coming direction clutch;

comparing the direction clutch slip to a reference value; and determining when the on-coming direction clutch substantially fills in response to the on-coming direction clutch slip decreasing as compared to the reference value.

* * * * *